(12) United States Patent
Goto

(10) Patent No.: US 7,466,083 B2
(45) Date of Patent: Dec. 16, 2008

(54) PROTECTIVE DEVICE FOR VEHICLE ELECTRONIC APPARATUS

(75) Inventor: Yoshifumi Goto, Nishio (JP)

(73) Assignee: DENSO CORPORATION, Kariya (JP)

( * ) Notice: Subject to any disclaimer, the term of this patent is extended or adjusted under 35 U.S.C. 154(b) by 422 days.

(21) Appl. No.: 11/232,913

(22) Filed: Sep. 23, 2005

(65) Prior Publication Data

US 2006/0087790 A1    Apr. 27, 2006

(30) Foreign Application Priority Data

Oct. 22, 2004    (JP)    ............................. 2004-308193

(51) Int. Cl.
*H01J 13/46*    (2006.01)
*H05B 37/02*    (2006.01)

(52) U.S. Cl. ..................... 315/209 R; 315/32; 315/225; 315/291; 363/16; 363/37; 363/50; 363/55; 363/56.01; 361/93.8; 361/103

(58) Field of Classification Search ................... 363/50, 363/55, 56.01, 56.02, 16, 37, 95; 361/103, 361/93.8; 345/204; 315/32, 209 R, 225, 315/291

See application file for complete search history.

(56) References Cited

U.S. PATENT DOCUMENTS 5,384,516 A    1/1995    Kawabata et al.

6,285,132 B1*    9/2001    Conley et al. ................. 315/86
2004/0056825 A1*    3/2004    Min et al. ...................... 345/38
2004/0120167 A1*    6/2004    Nakamura et al. ............ 363/37
2005/0189885 A1*    9/2005    Haruna et al. ................ 315/291
2006/0158131 A1*    7/2006    Mitsuyasu et al. ...... 315/209 R

FOREIGN PATENT DOCUMENTS

| JP | A-57-115791 | 7/1982 |
| JP | A-06-076974 | 3/1994 |
| JP | A-11-087075 | 3/1999 |
| JP | A-2004-288375 | 10/2004 |

OTHER PUBLICATIONS

Office Action dated Apr. 25, 2008 in corresponding Japanese Patent Application No. 2004-308193 (and English translation).

* cited by examiner

*Primary Examiner*—Akm Enayrt Ullah
*Assistant Examiner*—Johali A Torres Ruiz
(74) *Attorney, Agent, or Firm*—Posz Law Group, PLC

(57) ABSTRACT

A protective device for a vehicle electronic apparatus, which includes an inverter for converting a direct-current voltage into an alternating-current voltage for the vehicle electronic apparatus, detects a temperature of the inverter. Also, the protective device controls a power supply of the direct-current voltage to the inverter. The protective device stops the power supply to the inverter when the temperature of the inverter reaches a predetermined temperature.

3 Claims, 2 Drawing Sheets

PROTECTIVE DEVICE FOR VEHICLE ELECTRONIC APPARATUS

CROSS REFERENCE TO RELATED APPLICATION

This application is based on and incorporates herein by reference Japanese Patent Application No. 2004-308193 filed on Oct. 22, 2004.

FIELD OF THE INVENTION

The present invention relates to a protective device for a vehicle electronic apparatus that utilizes an alternating-current voltage. The protective device protects a vehicle electronic apparatus from heat of an inverter that converts a direct-current voltage into the alternating-current voltage.

BACKGROUND OF THE INVENTION

Some vehicle electronic apparatuses require an alternating-current voltage. For example, a liquid crystal display apparatus for a vehicle requires a light source for backlighting to obtain bright images on a liquid crystal panel. For the light source for backlighting, usually a discharge lamp (e.g., a fluorescent lamp) is used.

The fluorescent lamp is lit by a high-voltage high-frequency alternating-current voltage of an inverter, which converts the direct-current voltage of a battery into the high-frequency alternating-current voltage. Then, the alternating-current voltage is boosted by a power transformer and applied to the fluorescent lamp (see U.S. Pat. No. 5,384,516, corresponding to Unexamined Japanese Patent Publication No. H05-242987).

The inverter includes a plurality of power switching elements, which are connected in the bridge form. The liquid crystal display apparatus, which is mounted in the car, is often exposed to very severe conditions. In the conditions, the switching elements may suffer from an internal defect, and may generate heat.

Conventionally, the output frequency of the inverter is detected by a microcomputer in order to detect defects. When the output frequency changes, a power supply to the inverter is stopped.

The switching elements are soldered to a circuit board. Solder sometimes becomes to have a large resistance. This arises if the soldering is not properly performed and bubbles are captured in the solder, or if a soldering surface of a terminal is only partly soldered. When the solder has the large resistance, the solder generates heat. Therefore, the temperature of the switching elements increases, and this may result in causing defects.

However, for this kind of soldering defects of the switching elements, the conventional defect detective method, which detects a change in the output frequency of the inverter, cannot detect the defects of a soldering part. This is because the output frequency does not change, even when the temperature of the soldering part increases.

SUMMARY OF THE INVENTION

The present invention addresses the above disadvantages. Thus, it is an objective of the present invention to provide a protective device for a vehicle electronic apparatus, which detects heat generation caused by the soldering defects, as well as detecting defects of the inverter.

To achieve the objective of the present invention, there is provided a protective device for a vehicle electronic apparatus. The protective device, which includes an inverter for converting a direct-current voltage into an alternating-current voltage, detects a temperature of the inverter. The protective device stops the power supply to the inverter when the pulse signal of detected temperature rises too high due to defective soldering, for instance.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
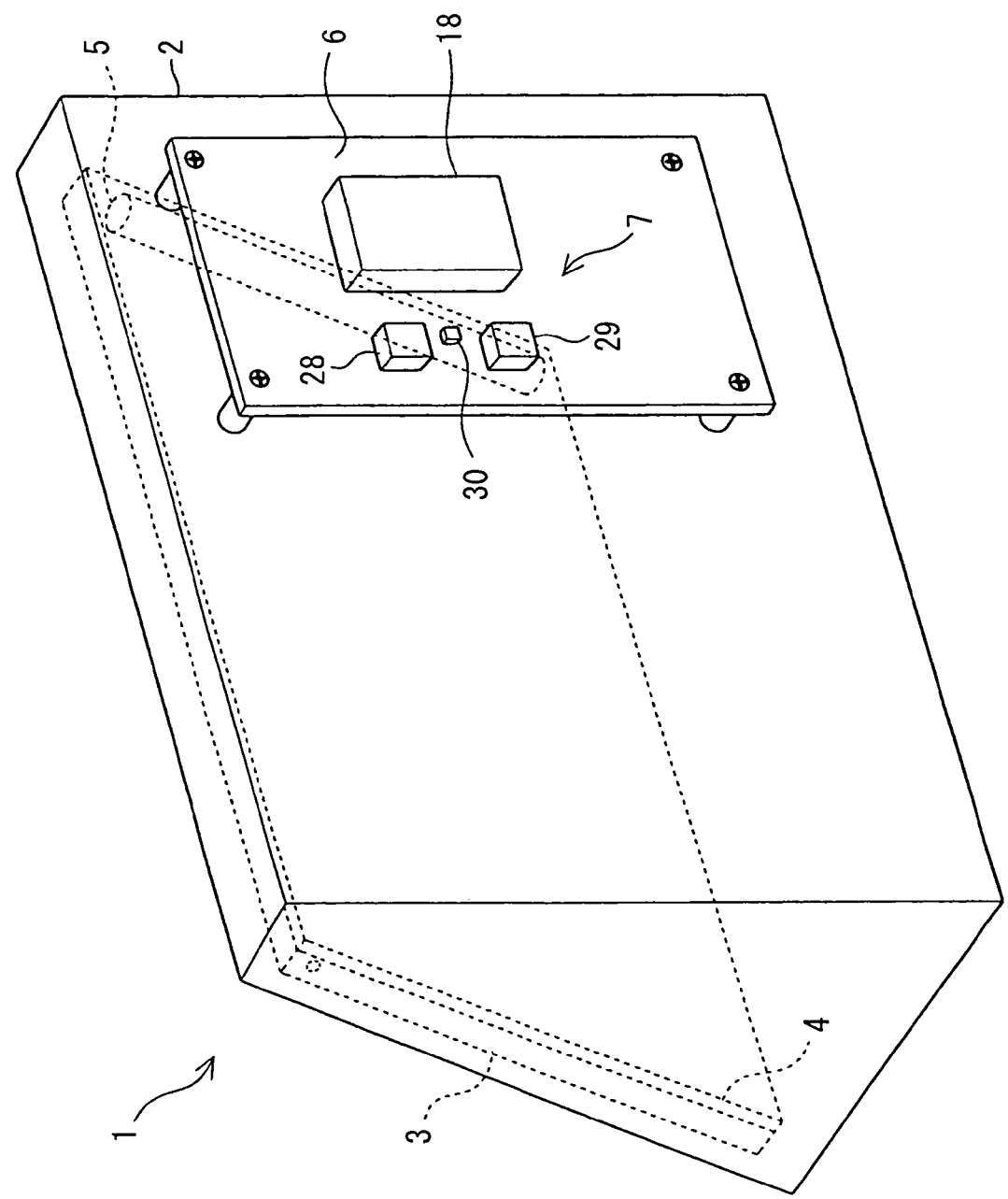
FIG. 1 is a perspective view of a liquid crystal display apparatus as seen from its backside.

Some vehicle electronic apparatuses require an alternating-current voltage. In this embodiment, a liquid crystal display apparatus 1 of a car navigation system is described as one of the vehicle electronic apparatuses. Referring to FIG. 1, the liquid crystal display apparatus 1 is mounted in a vehicle. In a metal outer case 2, a liquid crystal panel 3 is mounted so that its tilt angle is adjustable. A backlight unit 4 is installed on a backside of the liquid crystal panel 3. The backlight unit 4 includes a discharge lamp, such as a fluorescent lamp 5, and a light guide body (not shown). The fluorescent lamp 5 is installed in a unilateral part, and serves as a light source for backlighting. Light of the fluorescent lamp 5 is incident on a side of the light guide body. Then, the light is applied over a whole backside of the liquid crystal panel 3 by use of the light guide body. Because the light, which is applied by the light guide body, passes through the liquid crystal panel 3, an image on the liquid crystal panel 3 is made clearly visible.

An electric circuit board 6 is fixed on the backside of the outer case 2. The circuit board 6 includes electronic components, which form a lighting device 7 of the fluorescent lamp 5. The circuit board 6 includes other electronic components, which are not shown in FIG. 1.

Figure 2:
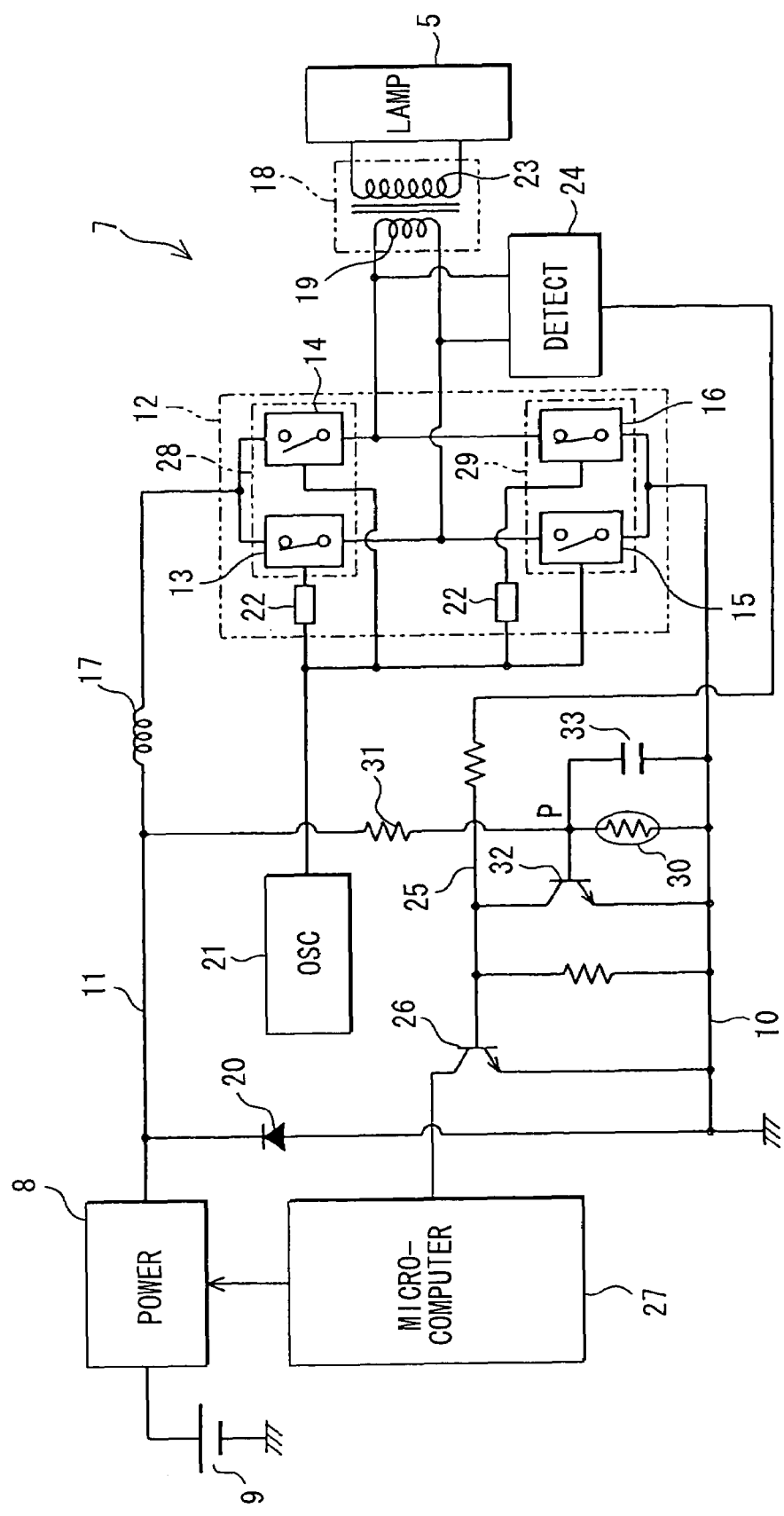
FIG. 2 is a circuit diagram of an embodiment of this prevention.

As shown in FIG. 2, a power circuit 8 regulates a direct-current voltage of a battery 9, which is mounted in the car, at a stable predetermined level. The direct-current voltage is outputted between a ground wire 10 and a power bus bar 11. Then, the direct-current voltage, which is generated in this power circuit 8, is converted into an alternating-current voltage by an inverter 12.

The inverter 12 includes a bridge circuit having a plurality of, specifically four, switching elements 13 to 16. One terminal of a pair of input terminals of the inverter 12 is connected to the power bus bar 11 through a noise removal coil 17. The other terminal of the pair of input terminals is connected to the ground wire 10. A pair of output terminals of the inverter 12 is connected to the primary coil 19 of a power transformer 18. A rectifying diode 20 is connected between the ground wire 10 and the power bus bar 11.

The switching elements 14 and 15 are controlled to be opened or closed directly based on a pulse generated by an oscillator 21. The switching elements 13 and 16 are controlled to be opened or closed based on a signal, which a logical element 22 produces by inversing the pulse generated by the oscillator 21. Therefore, one group of switching elements 14, 15 and the other group of switching elements 13, 16 are alternately opened and closed. As a result, in the inverter 12, the direct-current voltage generated by the power circuit 8 is converted into the alternating-current voltage of a predetermined high frequency. Then, the alternating-current voltage is applied to the primary coil 19 of the power transformer 18.

The power transformer 18 boosts and outputs the alternating-current voltage, which the inverter 12 applied to the primary coil 19, from a secondary coil 23. The fluorescent lamp 5 is connected to the secondary coil 23 of the power transformer 18. The fluorescent lamp 5 lights, when the high-frequency high-voltage alternating-current voltage from the power transformer 18 is applied to the fluorescent lamp 5.

A frequency detection circuit 24 detects an output voltage frequency of the inverter 12. The frequency detection circuit 24 detects, for example, a voltage between the pair of output terminals of the inverter 12, and generates a pulse according to a change of the voltage. The pulse generated by the frequency detection circuit 24 is outputted to a signal wire 25. The pulse, a frequency of which coincides with the output frequency of the inverter 12, is transmitted to the signal wire 25.

The signal wire 25 is connected to the base of a first NPN transistor 26. The collector of the transistor 26 is connected to a microcomputer 27. The emitter of the transistor 26 is connected to the ground wire 10. The transistor 26 is switched to ON to transmit a low level signal to the microcomputer 27, when the pulse signal of the signal wire 25 becomes high. The transistor 26 is switched to OFF to transmit a high level signal to the microcomputer 27, when the pulse signal of the signal wire 25 becomes low.

Therefore, the transistor 26 reverses the high and low signals of the signal wire 25, and transmits the reversed signals to the microcomputer 27. Then, the microcomputer 27 detects the output frequency of the inverter 12 based on the alternating and repeating inputs of high and low signals. When the output frequency does not satisfy a pre-memorized standard frequency, or does not stay within a pre-memorized frequency range, a switch element (not shown) of the power circuit 8 is designed to be switched to OFF, and a supply of the direct-current voltage from the power circuit 8 to the inverter 12 is stopped.

In the inverter 12, the switching elements 13 and 14 at the positive side are integrated in a first IC chip 28 and the switching elements 15 and 16 at the ground side are integrated in a second IC chip 29. As shown in FIG. 1, the first IC chip 28 and the second IC chip 29 are arranged close to the power transformer 18 on the circuit board 6. A thermal resistance element 30, which serves to detect temperature, is located close to and between the first IC chip 28 and the second IC chip 29. For example, the thermal resistance element 30 has a positive temperature characteristic, where an electric resistance becomes larger as a temperature of the thermal resistance element 30 increases.

A second NPN transistor 32 is located between the signal wire 25 and the ground wire 10. The collector of the transistor 32 is connected to the signal wire 25 and the emitter of the transistor 32 is connected to the ground wire 10. The thermal resistance element 30 is connected between the ground wire 10 and the power bus bar 11, and is serially connected to a resistor 31 so as to form a voltage dividing circuit. The common junction point P between the thermal resistance element 30 and the resistor 31 is connected to the base of the transistor 32. A speed capacitor 33 is connected in parallel with the thermal resistance element 30 so as to increase the ON/OFF switching speed of the transistor 32.

In the voltage dividing circuit including the thermal resistance element 30 and the resistor 31, the electrical resistance of the thermal resistance element 30 increases according to the temperature increase of the thermal resistance element 30 due to an ambient temperature increase. Then, a voltage at the point P of the voltage dividing circuit increases. When the voltage reaches a predetermined voltage, the transistor 32 is switched to ON. Specifically, when the temperature of the thermal resistance element 30 increases to be more than the predetermined temperature due to heat from the first IC chip 28 and/or the second IC chip 29, the transistor 32 is switched to ON. When the transistor 32 is switched to ON, the signal wire 25 is connected to the ground wire 10, which is a fixed voltage part. Therefore, even the pulse signal is outputted to the signal wire 25 from the frequency detection circuit 24, the pulse signal is grounded to the ground wire 10. Thus, no pulse is applied to the microcomputer 27 as if the inverter 12 is not operating, when the temperature rises too high.

When both the first IC chip 28 and the second IC chip 29 properly perform, the output frequency of the inverter 12 coincides with the frequency of the pulse generated by the oscillator 21. Then, the frequency detection circuit 24 outputs the pulse signal, the frequency of which coincides with the generated pulse from the oscillator 21, to the signal wire 25. Also the temperature of the thermal resistance element 30 is lower than the predetermined temperature, and therefore the electrical resistance of the thermal resistance element 30 is low. Thus, the transistor 32 is OFF, and the signal wire 25 is disconnected from the ground wire 10. In this condition, because the microcomputer 27 receives the predetermined-frequency pulse signal through the transistor 26, the power circuit 8 is not switched to OFF.

Certain seasons or certain usage conditions may cause internal defects of the first IC chip 28 (switching elements 13, 14) or the second IC chip 29 (switching elements 15, 16). When the first IC chip 28 or the second IC chip 29 have the internal defects, a switching performance is changed. This appears as a change in the output frequency of the inverter 12. Then, the frequency of the pulse signal generated by the frequency detection circuit 24 is changed, and the microcomputer 27 switches a switch element (not shown) to OFF to disconnect the power circuit 8 from the battery 9. Likewise, the supply of the direct-current voltage to the inverter 12 is stopped. Therefore, the temperatures the first IC chip 28 and the second IC chip 29 are limited from increasing.

When soldering the first IC chip 28 and the second IC chip 29 on the circuit board 6, bubbles may be captured in solder due to an improper or defectivce soldering. Also, a soldering surface, a whole of which is to be soldered, of a terminal may only be partly soldered. In this case, the connection between the circuit board 6 and the IC chips 28, 29 may have a large resistance. When the resistance at the connection is large, the soldering part generates heat.

Then, the temperature of the thermal resistance element 30, which is arranged in the vicinity of the first IC chip 28 and the second IC chip 29, increases, resulting in a resistance increase of the thermal resistance element 30. This is followed by a voltage increase at the common junction point P between the thermal resistance element 30 and the resistor 31. When the temperature of the thermal resistance element 30 becomes more than the predetermined temperature, and the resistance becomes more than a predetermined value, an electric potential at the point P becomes more than a predetermined value to switch the transistor 32 to ON. Then the signal wire 25 is connected to the ground wire 10. The electric potential of the signal wire 25 becomes the electric potential of the ground wire 10, and does not change. Therefore, a high-level signal from the transistor 26 is continuously inputted to the microcomputer 27. Then, the microcomputer 27 determines that an input frequency is changed, and the switch element (not shown) of the power circuit 8 is switched to OFF to disconnect the power circuit 8 from the battery 9.

Likewise, in case of the defects of the IC chips 28, 29 and the heat generation of the IC chips 28, 29 due to defects of connection with the circuit board 6, the defects and the heat generation are detected and the supply of the direct-current voltage to the inverter 12 is stopped. Therefore, it will be prevented that the defects of the IC chips 28, 29 continue to be undetected, and heat generation continues for a long time.

The present invention is not limited to the embodiment, but may be modified as follows.

The output frequency of the inverter 12 may be detected through a voltage change of the secondary coil 23 of the power transformer 18.

The pulse signal generated from the frequency detection circuit 24 may be directly inputted to the microcomputer 27, instead of being transmitted through the transistor 26. In this case, the microcomputer 27 disconnects the power circuit 8 from the battery 9 when the electrical potential at the point P becomes more than the predetermined electric potential.

The thermal resistance element 30 may be arranged anywhere as long as the thermal resistance element 30 detects the temperature of the first IC chip 28 and/or the second IC chip 29.

The thermal resistance element 30 may have a negative temperature characteristic, in which the resistance decreases with an increase of the temperature.

The light source for backlighting is not limited to the fluorescent lamp. Alternative discharge lamps may be used. Further, the light source is not limited to the discharge lamp.

Still further, the vehicle electronic apparatus may be any other apparatus, which uses an inverter.

Additional advantages and modifications will readily occur to those skilled in the art. The invention in its broader terms is therefore not limited to the specific details, representative apparatus, and illustrative examples shown and described.

What is claimed is:

1. A protective device for a vehicle electronic apparatus, which includes an inverter for converting a direct-current voltage into an alternating-current voltage for the vehicle electronic apparatus, the protective device comprising:
    a temperature detecting means for detecting a temperature of the inverter;
    a control means for controlling a power supply of the direct-current voltage to the inverter, the control means stopping the power supply to the inverter when the temperature of the inverter reaches a predetermined temperature;
    a frequency detecting means for detecting a frequency of the alternating-current voltage, which is generated by the inverter, wherein: the vehicle electronic apparatus further includes a liquid crystal panel and a light source for backlighting; the alternating-current voltage is applied to the light source for backlighting to light the light source; and the control means further stops the power supply to the inverter when the frequency of the alternating-current voltage changes;
    a signal wire connecting the frequency detecting means and the control means to apply pulse signals corresponding to the alternating-current voltage to the control means; and
    a switching means for connecting the signal wire to a fixed voltage part when the temperature of the inverter reaches the predetermined temperature.

2. The protective device according to claim 1, wherein:
the inverter includes a plurality of switching elements, which form a bridge circuit; and
the temperature detecting means is arranged in the vicinity of the switching elements.

3. The protective device according to claim 2, wherein:
the temperature detecting means is located between the switching elements.

* * * * *